July 27, 1937. F. T. IRGENS Re. 20,455

INTERNAL COMBUSTION ENGINE

Original Filed Oct. 20, 1930

Inventor

Finn T. Irgens

By Wheeler, Wheeler & Wheeler

Attorneys

Reissued July 27, 1937

Re. 20,455

UNITED STATES PATENT OFFICE 20,455

INTERNAL COMBUSTION ENGINE

Finn T. Irgens, Wauwatosa, Wis., assignor to Outboard Motors Corporation, Milwaukee, Wis., a corporation of Michigan Original No. 1,827,818, dated October 20, 1931, Serial No. 489,793, October 20, 1930. Application for reissue October 26, 1935, Serial No. 46,926

10 Claims. (Cl. 123—73)

This invention relates to improvements in internal combustion engines.

It is the object of the present invention to increase the volumetric efficiency of an internal combustion engine. My invention is illustrated in a two cycle engine but certain features of it are applicable to any engine.

I seek to accomplish the indicated result in several different ways involving, first, the provision of a duplex valve structure and two separate mixture admission ports, thereby obtaining twice as much valve opening without increasing the dimensions of the parts as would be possible with the use of a single port of similar angular extent; secondly, by separately controlling the passages leading to the two ports opening into the crank case compression chamber and by advancing the timing of the valve controlling the port which is open only at high engine speeds, whereby in effect to increase the valve opening at high engine speeds and thereby to compensate for the effect of mixture inertia at such speeds; thirdly, by varying the relative dimensions of the passages leading to the respective ports so that the passage which is open only at high engine speeds will have somewhat greater capacity than the low speed passage, whereby additionally to compensate for the effect of mixture inertia which is relatively pronounced at high engine speeds; and fourthly, by using a multiple manifold and opening and closing the several manifolds successively, thereby approaching a condition of constant velocity of mixture travel and avoiding the pockets and dead spots and condensation of fuel occasioned by the throttled passage of mixture at low velocity through a single manifold large enough to handle efficiently the high velocity requirements.

It is my further purpose, by the passage design aforesaid, to tend to equalize the flow to the crank case compression chamber as between the denser and lighter components of the mixture so as to ensure the proper delivery of all material, and particularly to increase the velocity in the lower of the passages to overcome the tendency of the heavier material to collect therein. By cutting off the upper passage altogether at high engine speeds, I force all of the mixture to traverse the lower passage, thereby maintaining as high a velocity in the lower passage at half speed as is existent at full speed. By thus compensating my improved engine for changes of speed, I seek to obtain more power at higher speeds and more uniform results at all speeds than is possible in the use of any engine from which my invention is absent.

In the drawing.

Like parts are identified by the same reference characters throughout the several views.

Figure 1:
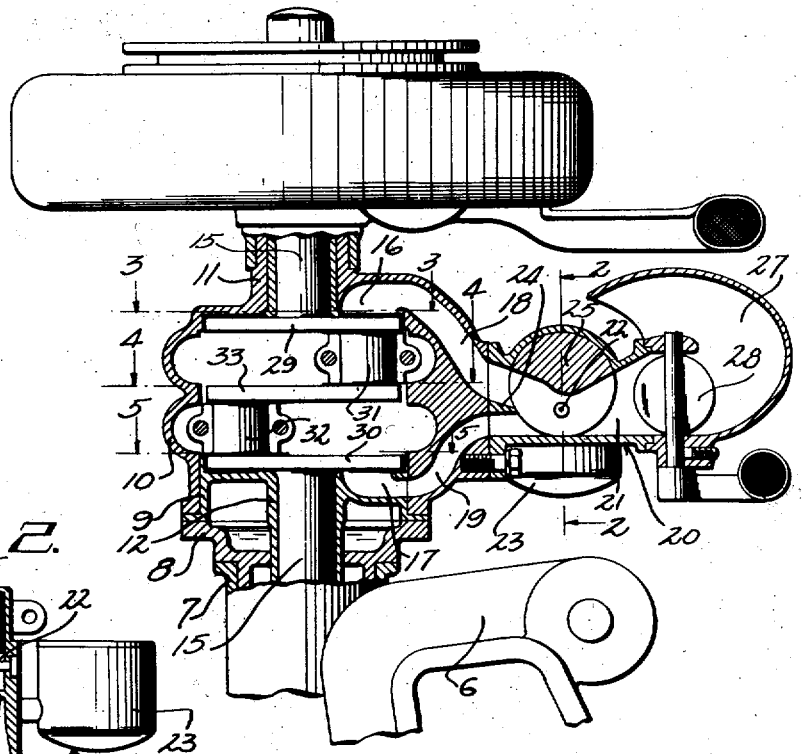
Figure 1 is a fragmentary side of elevation of an outboard motor engine showing in vertical axial section the crank case of a two cylinder opposed two cycle engine embodying this invention, the fuel tank and other parts lacking in pertinency to the present disclosure being omitted.

The bracket 6 carries a bearing sleeve 7 in which the engine support 8 is swiveled. Mounted on the engine support is the closure cap 9 for crank case 10, the crank case and closure cap having aligned bearings 11 and 12 for the crank shaft 15.

Figure 2:
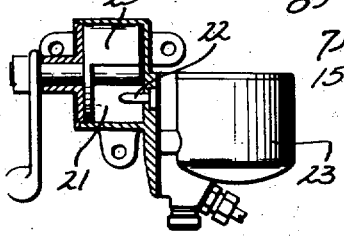
Figure 2 is a detail view in transverse section, taken in the plane indicated at 2—2 in Fig. 1.

Opening oppositely into the interior compression chamber of crank case 10 through the ends thereof, are the ports 16 and 17 leading to which are manifold passages 18 and 19 respectively, which are formed in the metal of the crank case. A carburetor 20 provides extensions of these passages uniting in the jet passage 21 into which jet 22 projects laterally from float chamber 23. The carburetor provides a tapering partition at 24 which divides the extension of passages 18 and 19 and co-acts with the throttle valve 25 which comprises a segment of a cylinder journaled in a cylindrical extension of jet passage 21 as shown in Figs. 1 and 2.

The inlet fitting 27 provides an extension of the jet passage 21 whereby such passage is bent back upon itself across the throttle valve chamber, thereby protecting the inlet from spray in outboard motor use. A choke valve at 28 restricts the inlet passage for the usual purpose.

Figure 3:
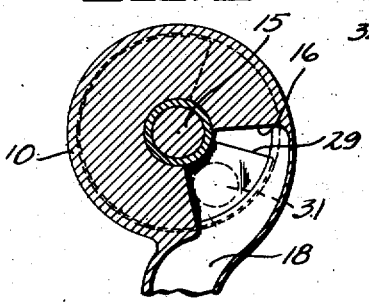
Figure 3 is a detail view in horizontal section, taken in the plane indicated at 3—3 in Fig. 1.
Figure 5:
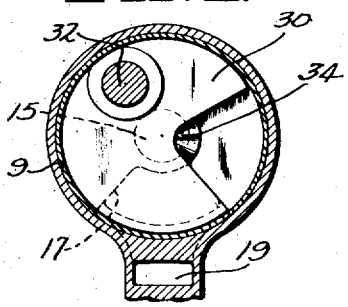
Figure 5 is a view taken in horizontal section in the plane indicated at 5—5 in Fig. 1.

The upper and lower inlet ports 16 and 17, whereby the mixture is admitted to the crank case, are controlled by crank cheek valves 29 and 30 which are preferably integral with the crank shaft 15 and connected by cranks 31 and 32 and an intermediate cheek 33. Each of the upper and lower cheeks 29 and 30 has a segmental opening registerable with its respective port 16 or 17, as shown in Figures 3 and 5. The respective openings in the valve cheeks 29 and 30 are preferably extended into the crank shaft at 34, as shown in Figure 5, thereby greatly increasing the volumetric efficiency of the valve by increasing its area without changing its overall dimensions.

Figure 4:
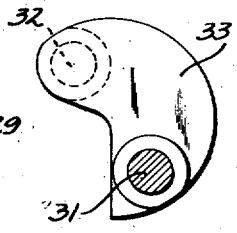
Figure 4 is a detail view of the intermediate crank disk as it appears when viewed in plan, one of the crank pins being shown in cross section taken in the plane indicated at 4—4 in Fig. 1.

It is particularly to be noted that the segmental opening in valve disk 29 is angularly advanced with respect to the segmental opening in valve disk 30, and as a result, port 16 will be opened and closed somewhat earlier than port 17. Figures 3, 4 and 5 show the relative positions of the parts in a given crank shaft position, and it will be observed that the valve disk 29 has a partially uncovered port 16 in Figure 3, while disk 30 is just at the point of uncovering its port 17 in Figure 5. The disposition of throttle valve 25 with respect to manifold passages 18 and 19 is such that passage 19 is first to open and last to close. Thus, passage 18 and port 16 are used only at relatively wide open positions of the throttle valve and consequently high engine speeds.

Theoretically, the valve timing, like the ignition timing, should be advanced at high engine speeds, since the inertia of the mixture is such that an appreciable amount of time is required to set it in motion and stop it. At high engine speeds the time interval available for starting and stopping the mixture has decreased and in order to compensate for this decrease the valve timing should be advanced, particularly as to the time of opening. This is impractical in an ordinary single manifold engine, but since dual manifolding is being used in this engine and since dual valves are provided to open and close the respective manifold ports, it becomes possible to approach optimum conditions by advancing the timing of one valve with respect to the other and thereby increasing the relative period for which mixture is admitted to the crank case chamber and advancing the relative time at which mixture is first set in motion by the opening of the valve.

Figure 1 shows the position of the throttle valve at full engine speed. It will be observed that manifold passage 18 is larger than manifold passage 19, thereby compensating for increased resistance to flow at high mixture velocities. As the throttle valve is closed, passage 18 will be wholly cut off, while passage 19 remains open. And because of the reduction in engine speed and consequently reduced demand for mixture, the velocity through passage 19 under these circumstances will be approximately the same as the velocity through this passage at wide open throttle. The smaller passage is preferably beneath the larger so that the continuous flow of mixture through the smaller passage whenever the engine is running will keep this passage free of accumulations of unevaporized fuel.

Another reason for putting at the bottom of the crank case the inlet passage which is open at all times when the engine is running lies in the fact that the disk valve 30 has a better seal at the bottom of the crank case than is possible between valve 29 and the top of the crank case. The engine shown is arranged upon a vertical axis so that the weight of the crank shaft, fly wheel and associated parts is carried by the crank case through the crank cheek and valve disk 30. The close fit between disk 30 and the bottom of the crank case minimizes leakage at this point and any leakage which occurs past disk 29 will be unimportant for the reason that at low speeds the passage 18 is wholly cut off by throttle valve 25 and at high speeds the slight amount of leakage which might occur would be unimportant.

The use of multiple manifold passages and admission ports makes it possible to double the area of valve opening without increasing the size of the parts, thereby greatly increasing volumetric efficiency. It will be obvious that by using additional valves and manifolds, a still further increase could be made, each manifold being preferably cut off in succession in order to approach a condition of substantially constant velocity through the several manifolds.

The peculiar form of the central cheek is determined by its weight and the desirability of disposing that weight in a manner to counterbalance the loss of weight in cheeks 29 and 30 occasioned by the provision of the segmental openings therein.

Although I have chosen to illustrate the application of this invention to a two cylinder two cycle engine of conventional design having a single crank case chamber, those skilled in the art will readily understand that the provision of multiple manifolding and multiple valve control subject to throttle means for opening and closing the manifolds successively, is a feature applicable to any kind of internal combustion engine.

This application is a continuation in part of my application for Patent No. 1,932,521 granted October 31, 1933, and contains claimed subject matter divided therefrom.

I claim:

1. In an internal combustion engine, the combination with a compression chamber provided with a crank shaft and admission ports to said chamber, of means for varying the timing of gas admission through said ports, said means comprising valve mechanism operatively connected with the crank shaft to be actuated thereby for the opening of one of said ports in advance of the other during each cycle of engine operation, and a separate throttle valve means for controlling flow through at least one of said ports.

2. In an internal combustion engine, the combination with a crank shaft and a crank case compression chamber provided with admission ports, of means for varying the time in the engine cycle, of admission of gas through said ports, said means comprising valve mechanism operatively connected with the crank shaft to be operated thereby in each crank shaft cycle for the successive closing of the respective ports, and a separate throttle valve means for controlling gas admission through at least one of said ports.

3. In a two cycle internal combustion engine, the combination with a crank shaft and a crank case compression chamber provided with a plurality of mixture admission ports, of charge forming means for supplying mixture to said ports, and means for varying the portion of the engine cycle through which such mixture is supplied, said means comprising valve mechanism operatively connected with the crank shaft to be operated during each crank shaft cycle for the successive opening and successive closing of the respective ports, and a separate throttle valve operatively disposed to control mixture flow through at least one of said ports independently of the other, whereby to limit the total portion of the engine cycle through which mixture is admitted to said crank case.

4. In a two cycle engine, the combination with a compression chamber provided with mixture admission ports, of a crank shaft, charge forming means for preparing mixture for delivery through said ports to said chamber, and means for timing the portion of the engine cycle devoted to the admission of such mixture, said last mentioned means comprising crank shaft operated valve mechanism controlling the respective ports and timed to open said ports successively, and mechanism for progressively throttling said ports, said mechanism being operatively connected to throttle the port first opened by said valve means before throttling the other port.

5. In a two cycle engine, the combination with a compression chamber provided with mixture admission ports, of a crank shaft, charge forming means for preparing mixture for delivery through said ports to said chamber, and means for timing the portion of the engine cycle devoted to the admission of such mixture, said last mentioned means comprising crank shaft operated valve mechanism controlling the respective ports and timed to open said ports successively, and mechanism for progressively throttling said ports, said mechanism being operatively connected to throttle the port first opened by said valve means before throttling the other port, the port first throttled by said mechanism being of larger capacity than the port last throttled thereby.

6. A two cycle internal combustion engine comprising the combination with an upright crank shaft and a crank case provided with upper and lower ports, of disk valve elements mounted on said shaft and controlling the respective ports and provided with openings for registration with said ports successively, whereby to maintain one of said ports open in advance of the other, charge forming means for supplying mixture to the respective ports, and a separate mechanism for successively throttling at least one of said ports to substantially cut off the flow of mixture therethrough to said crank case, the said port throttled by said mechanism comprising the top port of said crank case, whereby to accelerate mixture flow through the lower port of said crank case while varying the total combined period of port opening for timing the admission of mixture to the crank case.

7. In an internal combustion engine, the combination with a crank shaft, a mixing chamber and a mixture receiving chamber, of means for timing the portion of the crank shaft cycle devoted to communication between said chambers, said means comprising a plurality of passages leading from the mixing chamber to the receiving chamber, individual crank shaft actuated valves controlling said passages and timed to provide successive open periods for the respective passages, and throttle valve mechanism operatively arranged for the opening and closing of the passage having the first open period as determined by said crank shaft actuated valve means.

8. In an internal combustion engine, the combination with a crank shaft, of a crank case compression chamber provided with bearings for said shaft and with ports opening into said crank case adjacent said bearings, and means for admitting mixture to the crank case through said ports for varying portions of the crank shaft cycle, said means comprising crank disks on said shaft constituting valve elements ported for controlling communication between said ports and said crank case, the ports of the crank disks and the ports of the crank case being so timed as to provide successive open periods for the respective ports, means for supplying mixture to the respective ports, and throttle valve means for successively opening and closing said ports and arranged to throttle the port having the first open period substantially completely before materially throttling the port having the last open period as determined by said crank shaft disks.

9. In an internal combustion engine, the combination with a crank shaft having ported valve disks, of a crank case having bearings for said shaft and mixture admission ports with which the ports of said disks are arranged to register for the control of mixture admission to said crank case, the positioning of said disks on said crank shaft with respect to the ports in the crank case being such as to provide successive open periods for the crank case mixture admission ports during each crank shaft cycle, and means for timing mixture admission to the crank case comprising a single charge forming device provided with manifolds leading to the crank case ports, and a single throttle valve movable successively across said manifolds in a direction to cut off flow through one of said ports before materially affecting flow through the other.

10. In an internal combustion engine, the combination with a crank shaft having ported valve disks, of a crank case having bearings for said shaft and mixture admission ports with which the ports of said disks are arranged to register for the control of mixture admission to said crank case, the positioning of said disks on said crank shaft with respect to the ports in the crank case being such as to provide successive open periods for the crank case mixture admission ports during each crank shaft cycle, and means for timing mixture admission to the crank case comprising a single charge forming device provided with manifolds leading to the crank case ports, and a single throttle valve movable successively across said manifolds in a direction to cut off flow through one of said ports before materially affecting flow through the other, said charge forming device comprising a mixing chamber having an air admission aperture and having delivery apertures registering with the respective manifolds, a jet projecting into the mixing chamber between said inlet and delivery apertures, and an imperforate wall opposed to said jet and provided with a pivotal mounting opposite said jet upon which said wall is movable across the successive delivery apertures.

FINN T. IRGENS.